US011153762B1

(12) United States Patent
Routt

(10) Patent No.: US 11,153,762 B1
(45) Date of Patent: Oct. 19, 2021

(54) SPECTRUM ACCESS OPTIMIZATION INCLUDING FOR 5G OR OTHER NEXT GENERATION USER EQUIPMENT

(71) Applicant: AT&T Mobility II LLC, Atlanta, GA (US)

(72) Inventor: Thomas J. Routt, Sequim, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 16/871,243

(22) Filed: May 11, 2020

(51) Int. Cl.
| | |
|---|---|
| *H04W 16/14* | (2009.01) |
| *H04W 72/08* | (2009.01) |
| *H04W 24/02* | (2009.01) |
| *H04W 24/08* | (2009.01) |

(52) U.S. Cl.
CPC .......... *H04W 16/14* (2013.01); *H04W 24/02* (2013.01); *H04W 24/08* (2013.01); *H04W 72/082* (2013.01)

(58) Field of Classification Search
CPC . H04W 72/04; H04W 72/0453; H04W 16/14; H04W 24/10; H04W 24/08; H04W 24/02; H04W 72/082; H04L 5/0055; H04L 5/001; H04B 17/318; H04B 17/309; H04B 17/373; H04B 7/0417; H04B 7/0632
See application file for complete search history.

(56) References Cited

U.S. PATENT DOCUMENTS

| | | | |
|---|---|---|---|
| 2007/0135122 A1* | 6/2007 | Dillon | H04W 36/30 455/433 |
| 2008/0212527 A1* | 9/2008 | Hosein | H04L 5/006 370/329 |
| 2016/0127997 A1* | 5/2016 | Ang | H04W 76/28 370/311 |
| 2020/0287785 A1* | 9/2020 | Barabell | H04L 41/12 |
| 2020/0305201 A1* | 9/2020 | Lei | H04W 72/0413 |

* cited by examiner

*Primary Examiner* — Fred A Casca
(74) *Attorney, Agent, or Firm* — Amin, Turocy & Watson, LLP

(57) ABSTRACT

The disclosed technology is directed towards a fifth generation (5G) spectrum access engine that operates to achieve 5G spectrum optimization. The 5G spectrum access engine provides optimized spectrum access in low-bands, mid-bands, and high-bands based on energy detection algorithms, data analytics, and/or a deep learning architecture. The 5G spectrum access engine can reallocate spectrum to user equipments, including to allocate Sub-6 frequencies to a user equipment when, based on energy sensing, the user equipment is experiencing poor signal quality with millimeter wave communications.

19 Claims, 12 Drawing Sheets

SPECTRUM ACCESS OPTIMIZATION INCLUDING FOR 5G OR OTHER NEXT GENERATION USER EQUIPMENT

TECHNICAL FIELD

The subject application relates to wireless communications systems in general, and more particularly to optimizing spectrum access, including for New Radio (NR)/fifth generation (5G) cellular wireless communications systems and/or other next generation networks.

BACKGROUND

Fourth Generation Long Term Evolution (4G LTE) and Fifth Generation/New Radio (5G) have generated essentially exponentially increases in bandwidth and spectrum resource usage. Spectrum is a highly valuable asset in its role as a fundamental resource used by mobile broadband networks. Mobile broadband communication networks in turn have emerged as a pervasive technology in the global economy.

As a result, demand for additional radio spectrum has increased dramatically throughout the world and shows no signs of diminishing. This trend is certain to accelerate in response to 5G requests, demands, or requirements for increasingly band-intensive applications, including enhanced mobile broadband, massive-scale connectivity, and reliable low-latency services.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
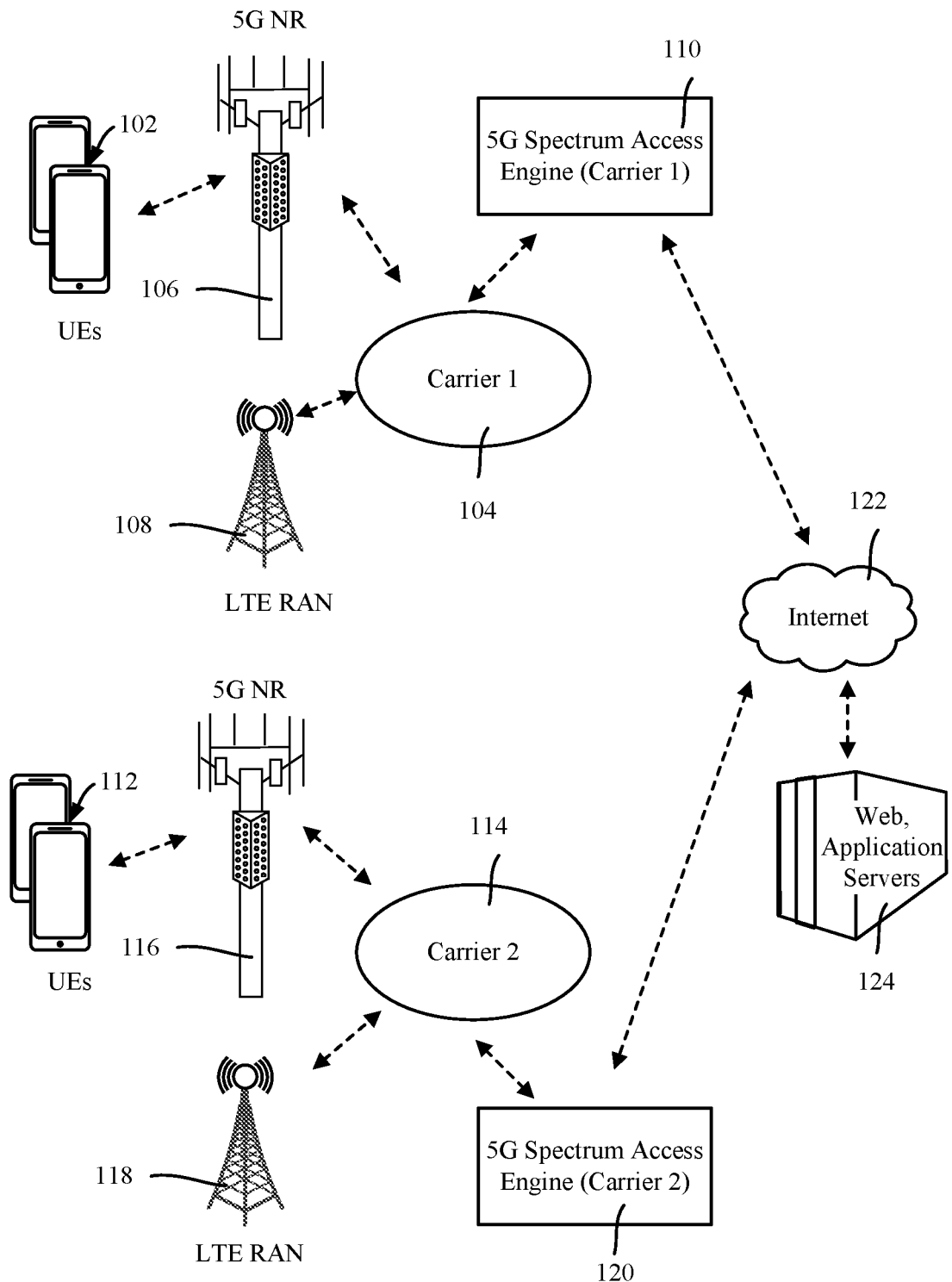
FIG. 1 illustrates an example wireless communication systems of two carriers configured for spectrum access optimization via spectrum access engines, in accordance with various aspects and embodiments of the subject disclosure.

The technology described herein is directed towards a 5G spectrum access engine (5G SAE) that operates to achieve 5G spectrum optimization. A general purpose of the 5G spectrum access engine is to provide optimized spectrum access in low-bands, mid-bands, and high-bands based on, but not limited to, energy detection algorithms, data analytics, and/or a deep learning architecture across a plurality of time and frequency domains. Other next generation networks can similarly benefit from the 5G spectrum access engine technology described herein.

It should be noted that terms used herein, such as "optimize," "optimization," "optimal" and the like only represent objectives to move towards a more optimal state, rather than necessarily obtaining ideal results. For example, "optimizing" spectrum access as used herein means moving towards a more optimal state (e.g., with respect to spectrum access, allocation, and usage), rather than necessarily achieving an optimal result.

As described herein, a 5G spectrum access engine can reside in the core network, and can front-end fifth generation (5G) gateways, fourth generation Long Term Evolution (4G LTE) gateways, and third generation (3G) Gateway General Packet Radio Service Support Node (GGSN) carrier core network gateways. In one aspect, the spectrum access engine can be implemented as a front-end to a 5G next generation core, and in addition to being able to front-end 5G and LTE Gateways, can be implemented as a front-end of GGSN Gateways, or as a software-defined network (SDN) element. The 5G spectrum access engine can be implemented as a cloud network component, can reside within a cloud computing environment, and can access spectrum resources through various internal and external interfaces.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (i.e., a capacity to make inference based on complex mathematical formalisms), which can provide simulated vision, sound recognition, and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee, and other 802.11 wireless technologies and/or legacy telecommunication technologies.

As shown in FIG. 1, user equipments 102 of a first carrier 104 communicate via fifth generation (5G)/new radio (NR) network equipment 106 and/or Long Term Evolution (LTE) network equipment 108. As described herein, the network equipment of the first carrier 104 includes or is coupled to a spectrum access engine 110.

Similarly, user equipments 112 of a second carrier 114 communicate via fifth generation (5G)/new radio (NR) network equipment 116 and/or fourth generation Long Term Evolution (4G LTE) network equipment 118. As described herein, the network equipment of the second carrier 114 likewise includes or is coupled to a spectrum access engine 120.

In the example of FIG. 1, the spectrum access engines 110 and 120 couple the network equipment of the carriers 104 and 114, respectively, to the internet 122. In turn, the internet provides access to the web and application servers 124.

In various implementations, one or more 5G spectrum access engines can reside in the core network and/or can be implemented as a front-end to a 5G Next Generation Core. As set forth herein, 5G spectrum access engines can front-end 5G gateways, 4G LTE gateways, and third generation (3G) Gateway General Packet Radio Service Support Node (GGSN) carrier core network gateways.

A spectrum access engine can be implemented in various ways. For example, a spectrum access engine can be implemented as a software-defined network (SDN) element. In another implementation, a 5G spectrum access engine can be implemented as a cloud network component, can reside within a cloud computing environment, and can access spectrum resources through a various internal and external interfaces. A 5G spectrum access engine can be implemented in the Radio Access Network (RAN). A 5G spectrum access engine can interface to a self-optimizing network (SON) and software defined network (SDN) based on network function virtualization (NFV) to provide mechanisms to sustain network conditions with changing conditions (i.e., due to interference).

In another aspect, a 5G spectrum access engine can be implemented through a software defined network functioning as a virtual Network Function (vNF) operating as a virtual machine (VM). A hardware platform can act as a host to one or more virtual machines configured to provide 5G spectrum access engine functionality.

Figure 2:
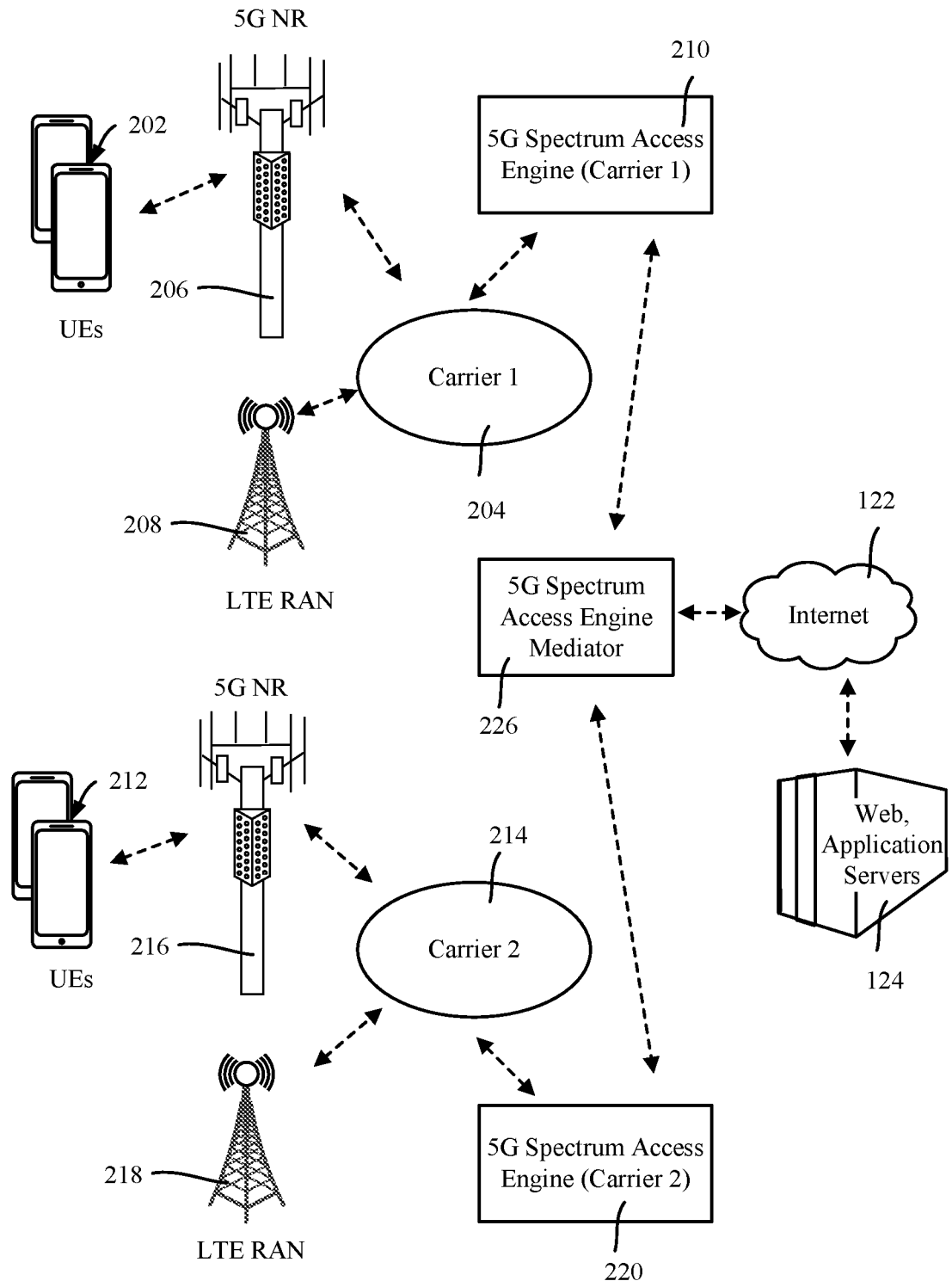
FIG. 2 illustrates example wireless communication systems of two carriers configured for spectrum access optimization via spectrum access engines, in which the carriers are linked by a spectrum access engine mediator, in accordance with various aspects and embodiments of the subject disclosure.

FIG. 2 is similar to FIG. 1, in that user equipments 202 of a first carrier 204 communicate via fifth generation (5G)/new radio (NR) network equipment 206 and/or Long Term Evolution (LTE) network equipment 208. As described herein, the network equipment of the first carrier 204 includes or is coupled to a spectrum access engine 210. User equipments 212 of a second carrier 214 communicate via fifth generation (5G)/new radio (NR) network equipment 216 and/or Long Term Evolution (LTE) network equipment 218. As described herein, the network equipment of the second carrier 214 includes or is coupled to a spectrum access engine 220.

However, in contrast to FIG. 1, in FIG. 2 a 5G spectrum access engine mediator 226 is provided. In general, the mediator 226 mediates spectrum access from multiple carriers. As one example, by way of the mediator 226, the carrier 204 can lease spectrum from the carrier 214 when implicated or requested (if available), and vice-versa. Further, the mediator 226 couples the spectrum access engines 210 and 220 to the internet 122 and thereby to the web and application servers 124.

Figure 3:
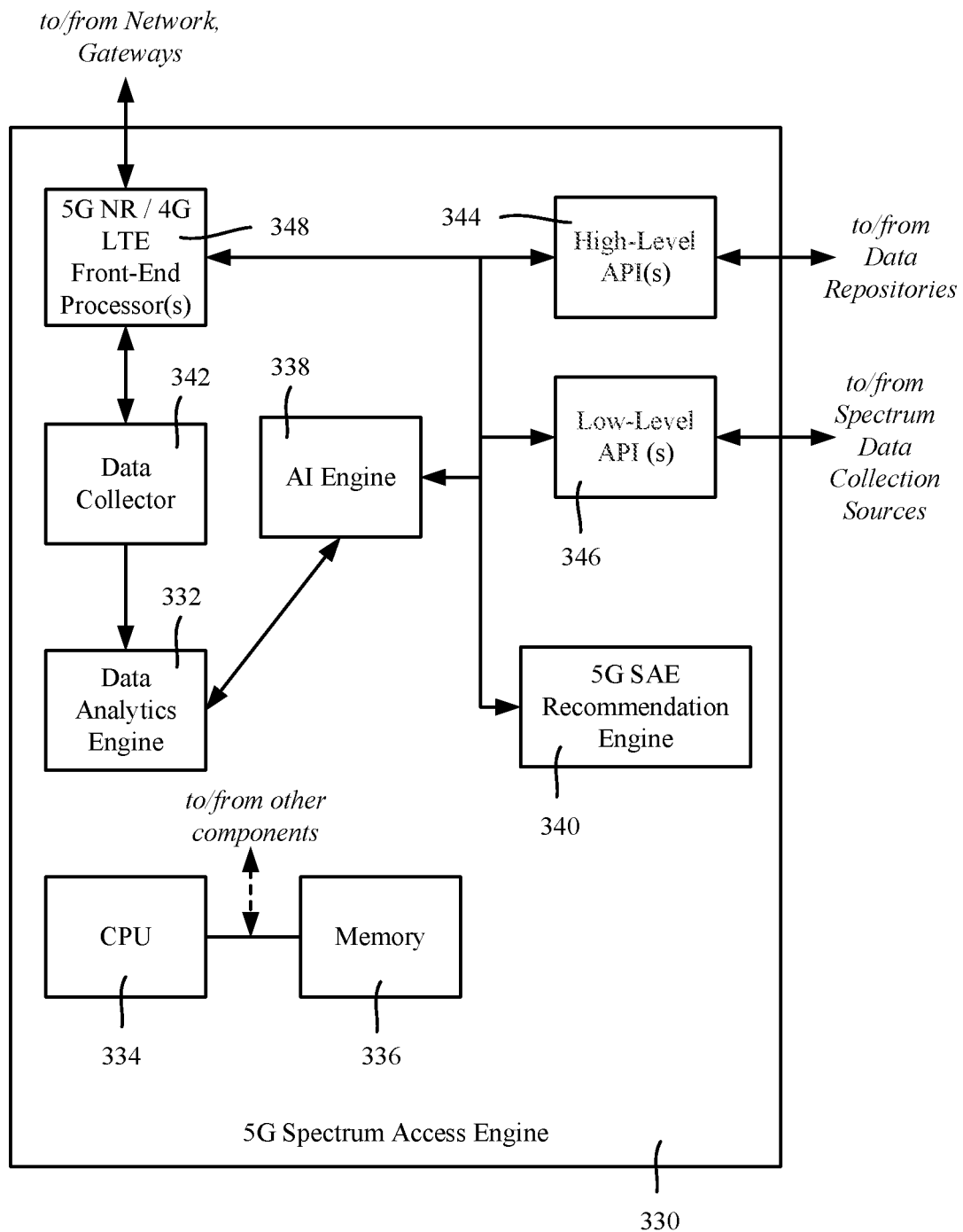
FIG. 3 is a block diagram showing an example spectrum access engine with example incorporated and/or coupled components, in accordance with various aspects and embodiments of the subject disclosure.

As shown in FIG. 3, a 5G spectrum access engine 330 can include a data analytics engine 332 [or be coupled to data analytics processing components via a data analytics application programming interface (API)]. A CPU 334 and memory 336 are shown for completeness, as a 5G spectrum access engine can be implemented in various ways, including as a server or service.

The illustrated 5G spectrum access engine 330 includes an artificial intelligence (AI) engine 338, such as incorporating deep learning components. The AI engine can store records and learn from interaction of targeted spectrum resource field-based sensors.

More particularly, the exemplified 5G spectrum access engine's AI engine 338 can incorporate a deep learning architecture, enabling the AI engine 338 to store a number of records and "learn" from interaction of energy detection algorithms and field-based sensors across a plurality of time and frequency domains and ranges. To this end, the 5G spectrum AI engine 338 can enable a deep learning architecture based upon a deep convolutional (multi-layer) neural network (DCNN) incorporating a multi-layer structure, convolution, max pooling (i.e., insertion of pooling layers between successive convolutional layers to reduce spatial size to contain the computation space in available memory), and nonlinear dynamical node arrangement, where exceptionally large labeled data sets invoke a deep, multi-layer structure. In an aspect, the AI engine 338 can utilize nonlinear dynamical node arrangement in the deep learning architecture to facilitate an improved breath, depth, and range of computational diversity over DCNN linear-mapped counterparts due, for example, to enabling selection of different nonlinear functions between DCNN layers.

In an aspect, the AI engine's DCNN convolutional layers can be structured similarly to windowed Fourier transforms to enable a small selection of n-dimensional input space relative to input of the data analytics engine 332 to be extracted and applied to output. The AI engine 338 can utilize a backpropagation algorithm to frame an optimization problem from which to determine weights of the network, where the backpropagation algorithm can be based on a chain rule method to differentiate.

The 5G spectrum access engine 330 can incorporate a data collector 342, coupled to the data analytics engine 332, to collect spectrum access and usage data from various entities, where the collected data may, for example, be stored and made accessible in a cloud storage environment and/or data lake repository. In this way, the data analytics engine 332 can generate real-time data analytics across a plurality of mobile computing platforms and application ecosystems.

As shown in FIG. 3, high-level APIs 344 and low-level APIs 346 are provided, which can communicate data to or from the data collector 342 via 5G NR/4G LTE front-end processor(s) 348. The front-end processor(s) 348 couple the 5G spectrum access engine 330 to and from network gateways, thereby facilitating network data collection. The high-level APIs 344 couple the 5G spectrum access engine 330 to and from data repositories, while the low-level APIs 346 couple the 5G spectrum access engine 330 to and from spectrum data collection sources, including sensors and the like.

As described herein, the data analytics engine 332 can interface to the AI engine 338. In this way, the 5G spectrum access engine 330 can incorporate a deep learning network architecture based on splitting and filtering a plurality of spectrum-sensed records, thereby enabling acceleration of forward-predictive alert conditions and anticipatory forward-prescriptive remedies across a plurality of frequency domains. Note that in an alternative implementation, the 5G spectrum access engine 330 can be coupled to an external AI engine via a suitable interface.

As shown in FIG. 3, the 5G spectrum access engine AI engine 338 can communicate with a 5G SAE recommendation engine 340 that can proactively generate 5G spectrum access and allocation requests based on a combination of mobile and fixed user spectrum usage data coupled with real-time in-field spectrum access request load. The 5G spectrum access engine AI engine 338, in conjunction with the recommendation engine, can be both predictive and prescriptive, thereby facilitating timely forward-predictive alert conditions and spectrum optimization response scenarios.

The 5G spectrum access engine can enable Dynamic Spectrum Sharing (DSS) on Radio Access Network (RAN) in Non-Standalone Architecture (NSA) Option 3 E-UTRAN New Radio-Dual Connectivity (EN-DC) architectures, where DSS allows both 4G Long Term Evolution (LTE) and 5G New Radio (NR) technologies to operate concurrently using the same spectrum resources on the same radio and the same carrier. The 5G spectrum access engine can enable DSS on RAN Standalone Architecture (SA) Option 2, where DSS enables a plurality of Sub-6 and mmWave 5G NR technologies to operate concurrently using the same spectrum resources on the same radio and the same carrier.

The 5G spectrum access engine 330 can utilize predictive and prescriptive data analytics that reflect mobile user access latency and end-to-end throughput to inform forward-predictive, traffic shaping awareness to proactively forecast LTE evolved Node B (eNB) and 5G next generation Node B (gNB) offered load in order to allocate dynamic spectrum sharing (DSS) resources. The 5G spectrum access engine 330 can utilize predictive and prescriptive data analytics that reflect mobile user access latency and end-to-end throughput to inform forward-predictive, traffic shaping awareness to proactively forecast against a plurality 5G gNB offered load in order to allocate DSS resources.

In an aspect, the 5G spectrum access engine 330 can receive sensed spectrum data from a plurality of network equipment and network elements including, for example, UEs, 5G NR equipment, LTE RAN equipment, Internet of Things (IoT) sensors, and 5G SAE mediator devices connected to one or multiple carrier networks. Frequency selection/re-selection logical decisions can be made based either on current spectrum loading conditions, and/or based on predictive or prescriptive data analytics, facilitating proactive spectrum sensing.

In an aspect, the 5G spectrum access engine 330 can analyze received sensed spectrum data utilizing a predictive analytics function that is configured to predict spectrum loading conditions based on an application programming interface between accumulated historical data and the 5G SAE AI engine, based in turn, on continuous calculation of streaming analytics to inform rapid spectrum reallocation decisions based on multivariable event processing.

In an aspect, the 5G spectrum access engine 330 can analyze received sensed spectrum data utilizing a prescriptive analytics function that is configured to preemptively optimize future outcomes, based for example, on embedded data analytics, predictive linear regression, and logistic regression algorithms.

Figure 4:
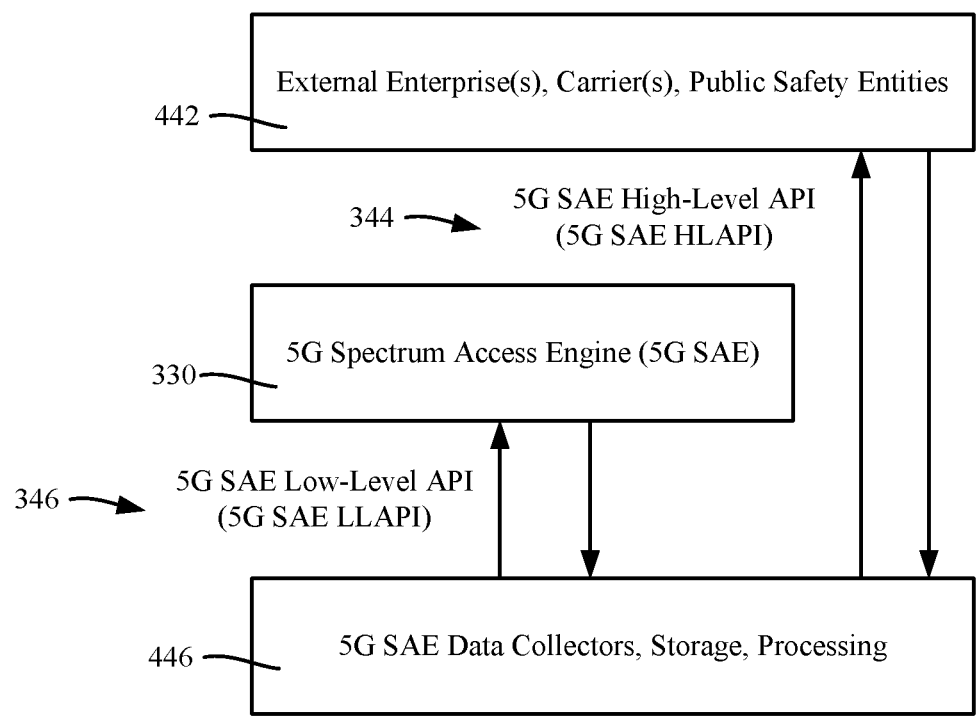
FIG. 4 is a block diagram showing a spectrum access engine coupled via application programming interfaces (APIs) to external enterprise(s), carrier(s) and public safety entities, and to data collectors, storage and processing components, in accordance with various aspects and embodiments of the subject disclosure.

FIG. 4 shows additional details of the 5G spectrum access engine's high-level APIs 344. As is shown, the high-level APIs 344 (HLAPIs) couple the 5G spectrum access engine 330 to external, non-5G spectrum access engine software-defined components 442, such as external enterprise(s), carrier(s), public safety entities, and the like. The 5G spectrum access engine's low-level APIs 346 (LLAPIs) couple the 5G spectrum access engine 330 to (block 446) internal 5G spectrum access engine components and sub-components, as well as to external spectrum data collection sources.

Further, via one or more APIs, the 5G spectrum access engine-collected and spectrum access engine-correlated data repositories can be accessible by big data analytics engines. Cloud-resident 5G spectrum access engine's data repositories can be accessible by data analytics engines, and by premise-resident data analytics applications.

With respect to network data, the 5G spectrum access engine can provide a central point of continuous, event-driven, query-driven, hybrid data acquisition and delivery models on behalf of and among a plurality of mobile applications and mobile devices. The 5G spectrum access engine can provide a central point of data correlation on behalf of and among a plurality of mobile applications and mobile devices. To this end, the 5G spectrum access engine 330 can collect and correlate mobile application and mobile device data, and store in data repositories that reside either within the carrier network or in the cloud.

The 5G spectrum access engine can provide a central point of dynamically-allocated spectrum management protocols among a plurality of mobile applications and mobile devices through use of data-centric routing of metadata exchanged among constituent 5G SAG aggregation nodes. The 5G spectrum access engine can perform deep packet inspection (DPI) of 5G spectrum access engine-tagged and meta-tagged data, to analyze packet payload, etc. rather than only packet headers.

Turning to another aspect, the 5G spectrum access engine 330 can perform energy detection based upon algorithmic identification of signal thresholds of interest as a function of energy across multiple time and frequency domains and ranges. The energy detection can be based on sensors that detect spectrum resources being allocated.

In one implementation, the 5G spectrum access engine 330 can detect reduction of signal strength below acceptable thresholds in the 5G millimeter wave (mmWave) spectrum, and dynamically allocate across a plurality of 5G sub-6 GHz (Sub6) spectrum, where 5G mmWave frequencies are defined within Frequency Range 2 (FR2) and where 5G (sub-six gigahertz) Sub-6 frequencies are defined within FR1, as defined by the 3rd Generation Partnership Project (3GPP).

Figure 5:
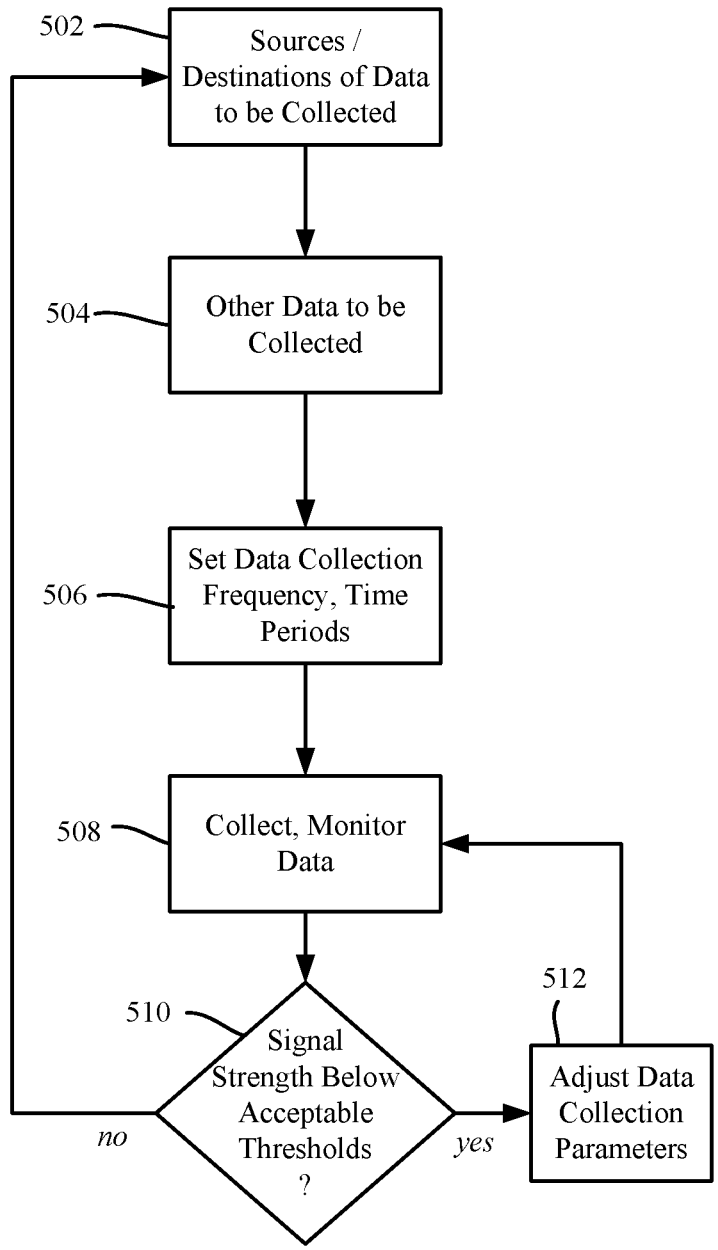
FIG. 5 is a flow diagram showing example operations performed by a spectrum access engine, in accordance with various aspects and embodiments of the subject disclosure.

More particularly, as shown in FIG. 5, after determining the data sources (block 502) and other data to be collected (block 504), the 5G spectrum access engine 330 sets the frequency of data collection and the time periods of collection (block 506). The 5G spectrum access engine 330 then collects and monitors the data (block 508).

If during collection and monitoring the signal strength drops below acceptable threshold level(s), (decision block 510), the various parameters including data collection parameters can be adjusted (block 512). Otherwise, at some point the 5G spectrum access engine 330 can repeat the overall process.

In this way, the 5G spectrum access engine 300 can detect reduction of signal strength below acceptable thresholds in the 5G millimeter wave (mmWave) spectrum. When this occurs, the 5G spectrum access engine 300 can dynamically allocate a plurality of Sub-6 GHz (Sub-6) spectra, including for example, citizens band radio service (CBRS) spectrum, and provide frequency-protecting, carrier-incumbent spectrum sharing where incumbents represent the highest tier in the framework. The 5G spectrum access engine can enable 3GPP-defined spectrum sensing techniques such as space-time adaptive processing (STAP) and Dynamic Frequency Selection (DFS) for detection of an incumbent device's signals.

Similarly, the 5G spectrum access engine can detect reduction of signal strength below acceptable thresholds in the 5G non-CBRS Sub-6 spectrum, and in response dynamically allocate CBRS spectrum, while providing frequency-protecting, carrier-incumbent spectrum sharing where incumbents represent the highest tier in the framework.

Similarly, the 5G spectrum access engine can detect reduction of signal strength below acceptable thresholds in the 5G mmWave spectrum and can dynamically allocate non-CBRS Sub-6 spectrum.

Similarly, the 5G spectrum access engine can detect reduction of signal strength below acceptable thresholds in the 5G mmWave spectrum and can dynamically allocate 4G long term evolution (LTE) spectrum should 5G NR Sub-6 spectrum not be available.

Similarly, the 5G spectrum access engine can dynamically re-allocate 5G mmWave or among a plurality of 5G NR Sub-6 spectra from 4G LTE upon detection of sufficient signal strength above acceptable thresholds.

Figure 6:
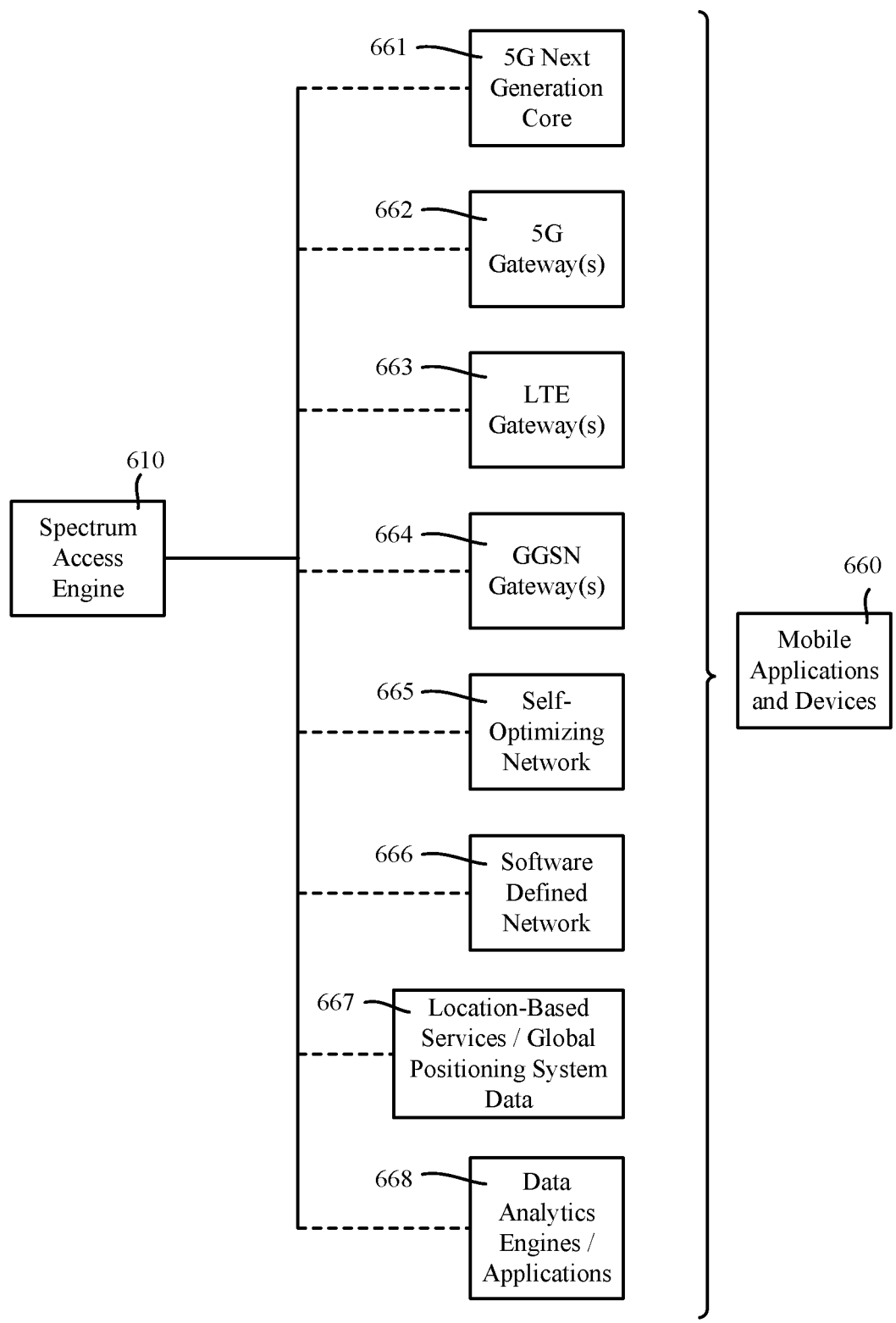
FIG. 6 is an example representation of how a spectrum access engine can be coupled to and/or implemented as a front-end to various networking components and services, in accordance with various aspects and embodiments of the subject disclosure.

FIG. 6 summarizes various ways in which a 5G spectrum access engine 610 can be deployed in a communications network. The dashed lines indicate that not all of the illustrated components 661-668 need be present; further it is understood that the illustrated components 661-668 are only non-limiting examples.

A 5G spectrum access engine 610 can provide a central point of integration (i.e., for mobile applications and/or devices 660) through a single carrier core network 5G next generation core (NGC) 661, 5G gateway(s) 662, LTE Gateway(s), or through a combination of carrier core networks 5G and LTE gateways. The 5G spectrum access engine 610 can provide a central point of integration within and among a plurality of mobile applications and devices 660 through a carrier core network GGSN Gateway, or through a plurality of carrier core network GGSN Gateways 662.

As further shown in FIG. 6, a 5G spectrum access engine 610 can interface to a self-optimizing network (SON) 665 and software defined network (SDN) 666.

The 5G spectrum access engine 610 can provide a central point of integration for location-based services and Global Positioning System (GPS) coordinate-based data. As also shown, the 5G spectrum access engine 660 can be coupled to external data analytics engines/applications 668.

With respect to the mobile applications and devices 660, the 5G spectrum access engine 610 can provide a central point of integration within and among the mobile applications for Internet Protocol (IP) data, i.e., originating from Signaling System 7 (SS7) packets. The 5G spectrum access engine can provide a central point of integration within and the mobile applications and mobile devices 660 to optimize dynamic Quality of Service (QoS), Priority and Preemption (QPP). The 5G spectrum access engine can provide a central point of dynamic, software-based, optimized data-centric, hierarchical, and location-based routing and switching functions within and among the mobile applications and mobile devices 660.

Figure 7:
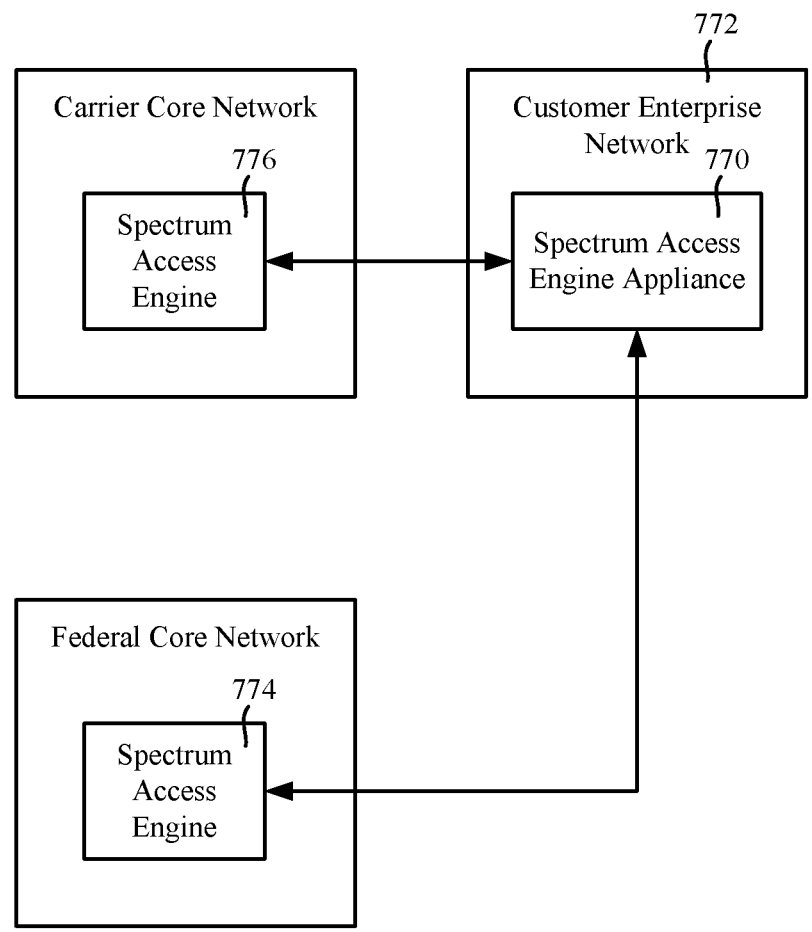
FIG. 7 is a block diagram representing example communications between spectrum access engines and spectrum access engines appliances, in accordance with various aspects and embodiments of the subject disclosure.

Turning to another aspect, as represented in FIG. 7, a 5G spectrum access engine appliance 770 can reside in a customer enterprise network 772 and can interface closely with federal and carrier core network-resident 5G spectrum access engines 774 and 776, respectively. The 5G spectrum access engine appliance 770 can be configured to receive integrated and correlated records, and to communicate with a 5G spectrum access engine (e.g., 778) in a secure manner in order to request further information, and/or to receive data analytics.

With respect to edge computing, a 5G spectrum access engine can optimize distributed cloud platform performance within network edge compute (NEC) processing environments. A 5G spectrum access engine can optimize distributed cloud platform performance within multi-access edge compute (MEC) processing environments by ensuring high performance for latency-/jitter-sensitive use cases.

Figure 8:
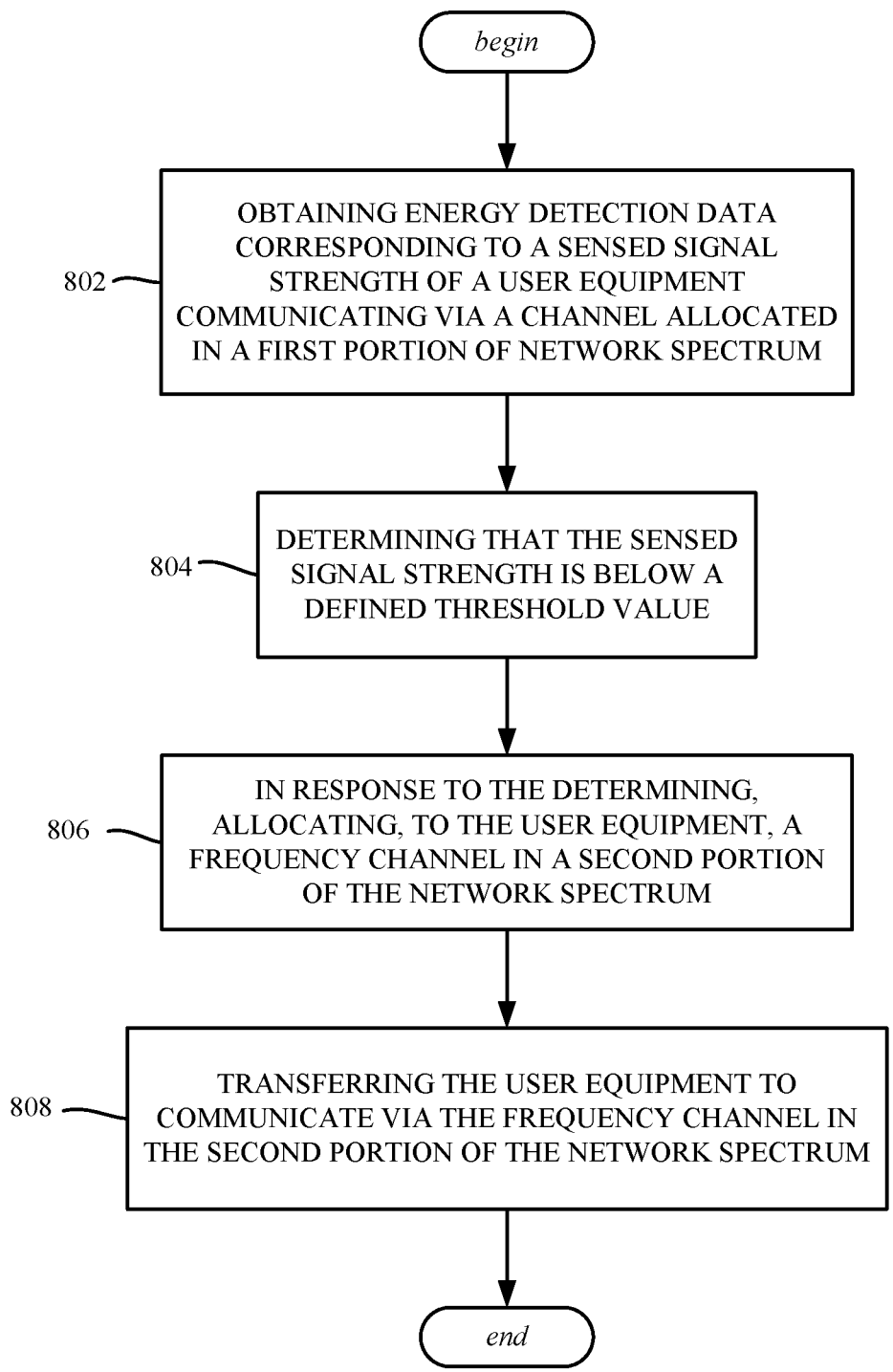
FIG. 8 illustrates example operations of a spectrum access engine to allocate different spectrum based on energy detection data, in accordance with various aspects and embodiments of the subject disclosure.

One or more example aspects are represented in FIG. 8, and can correspond to a system, comprising a processor, and a memory that stores executable instructions which, when executed by the processor of a spectrum access engine associated with a communications network, facilitate performance of operations. Example operation 802 represents obtaining energy detection data corresponding to a sensed signal strength of a user equipment communicating via a channel allocated in a first portion of network spectrum. Operation 804 represents determining that the sensed signal strength is below a defined threshold value. Operation 806 represents, in response to the determining, allocating, to the user equipment, a frequency channel in a second portion of the network spectrum. Operation 808 represents transferring the user equipment to communicate via the frequency channel in the second portion of the network spectrum.

The first portion of the network spectrum can be millimeter wave spectrum, and the second portion of the network spectrum can be sub-six gigahertz (Sub-6) spectrum. The Sub-6 spectrum can be a citizens band radio service (CBRS) spectrum. The network spectrum can be a fifth generation (5G) network spectrum, further operations can include determining, by the spectrum access engine, signals of an incumbent device associated with an incumbent entity operating in the citizens band radio service spectrum, and the allocating can include selecting the frequency channel in the citizens band radio service spectrum so as not to interfere with the signals of the incumbent device.

The first portion of the network spectrum can be millimeter wave spectrum, and the second portion of the network spectrum can be Sub-6 non-citizens band radio service spectrum.

The spectrum access engine can be configured as a centralized integration point to at least one of: a single carrier core network fifth generation (5G) next generation core, a 5G gateway, a long term evolution (LTE) gateway, or a combination of a 5G carrier core network gateway and the LTE gateway.

The spectrum access engine can be configured as a centralized integration point for location-based services.

Further operations can include, managing by the spectrum access engine, mobile applications and mobile devices, the managing controlling at least one of: device quality of service (QoS), device priority, device preemption, Internet Protocol data communication, location-based routing, location-based switching, data acquisition, data delivery, or data correlation.

The spectrum access engine can interface with a self-optimizing network and a software-defined network based on network function virtualization, and further operations can include adjusting network operations via the self-optimizing network and a software-defined network based on changing network conditions.

Further operations can include generating fifth generation (5G) spectrum access and allocation requests based on historical 5G spectrum usage data and current in-field spectrum access requests. The spectrum access engine can be coupled to a data analytics engine and a recommendation engine, and generating the 5G spectrum access and allocation requests can include obtaining information from the data analytics engine and the recommendation engine.

The spectrum access engine can be coupled to a mediator device that mediates spectrum access as assigned to different carriers.

Transferring the user equipment to communicate via the frequency channel in the second portion of the network spectrum can include determining a time-division duplex channel, or determining a frequency-division duplex downlink channel and a frequency-division duplex uplink channel.

The spectrum access engine can be communicatively coupled to a spectrum access engine appliance of an enterprise network to receive at least one of: data records or data analytics information.

Figure 9:
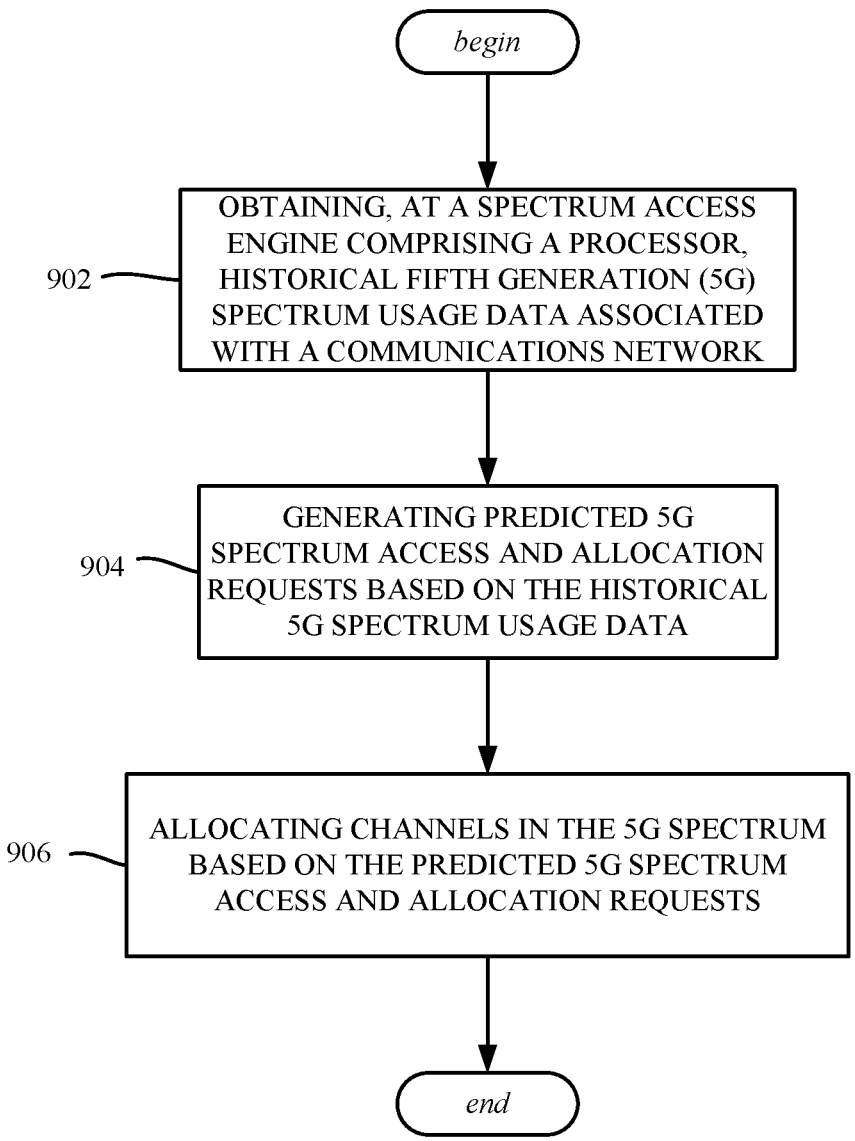
FIG. 9 illustrates example operations of a spectrum access engine to generate predicted spectrum access and allocation requests based on historical data, in accordance with various aspects and embodiments of the subject disclosure.

One or more example aspects are represented in FIG. 9, and can correspond to operations of a method. Operation 902 represents obtaining, at a spectrum access engine comprising a processor, historical fifth generation (5G) spectrum usage data associated with a communications network. Operation 904 represents generating predicted 5G spectrum access and allocation requests based on the historical 5G spectrum usage data. Operation 906 represents allocating channels in the 5G spectrum based on the predicted 5G spectrum access and allocation requests.

Allocating the channels can include allocating a first group of channels; aspects can include processing the historical 5G spectrum usage data to determine a prescriptive remedy to adjust for spectrum access and allocation based on network conditions, and allocating a second group of channels in the 5G spectrum based on the prescriptive remedy.

Aspects can include determining that a user equipment communicating in a first portion of the of the 5G spectrum sensed signal strength is experiencing low signal quality, and in response to the determining, selecting a second, different portion of the 5G spectrum for the user equipment and instructing the user equipment and the communications network to communicate over one time-division duplex channel in the second, different portion of the 5G spectrum or over two frequency-division duplex channels in the second, different portion of the 5G spectrum.

Obtaining the historical 5G spectrum usage data can include communicating, by the spectrum access engine, with a machine learning engine and a data analytics engine.

Figure 10:
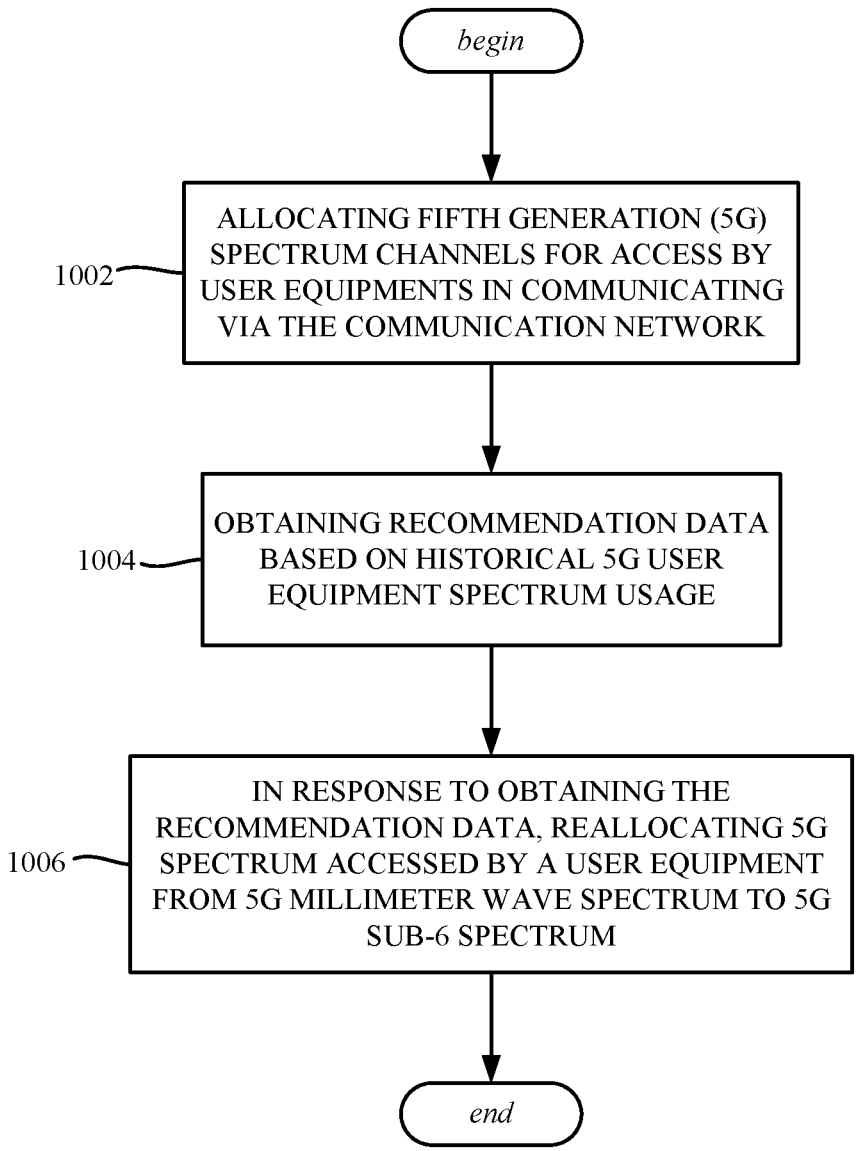
FIG. 10 illustrates example operations of a spectrum access engine to reallocate, with respect to a user equipment, millimeter wave spectrum to Sub-6 spectrum based on recommendation data, in accordance with various aspects and embodiments of the subject disclosure.

One or more aspects are represented in FIG. 10, such as implemented in a machine-readable storage medium, comprising executable instructions that, when executed by a processor of a spectrum access engine of a communications network, facilitate performance of operations. Operation 1002 represents allocating fifth generation (5G) spectrum channels for access by user equipments in communicating via the communication network. Operation 1004 represents obtaining recommendation data based on historical 5G user equipment spectrum usage. Operation 1006 represents, in response to obtaining the recommendation data, reallocating 5G spectrum accessed by a user equipment from 5G millimeter wave spectrum to 5G Sub-6 spectrum.

The user equipment can be a first user equipment, and further operations can include, in response to obtaining the recommendation data, reallocating 5G spectrum accessed by a second user equipment from 5G Sub-6 spectrum to 5G millimeter wave spectrum.

As can be seen, the technology described herein of a 5G spectrum access engine provides a central point of dynamic, software-defined management, control and provisioning functionality and structure within and among a plurality of carrier-based core networks. The technology optimizes spectrum usage, including in 5G deployments. The information generated by 5G spectrum access engine is valuable as it can capture, process, analyze, curate, store, search, and re-purpose spectrum metadata, mobile application data, mobile device data, geo-location data, key performance indicator (KPI) data, and release-fit data. Various products and service offerings can take advantage of a 5G spectrum access engine. The 5G spectrum access engine can centrally interconnect and dynamically manage optimized 5G spectrum as a hosting portal to a plurality of other core carrier networks.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-1-DMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is, data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods, etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 11:
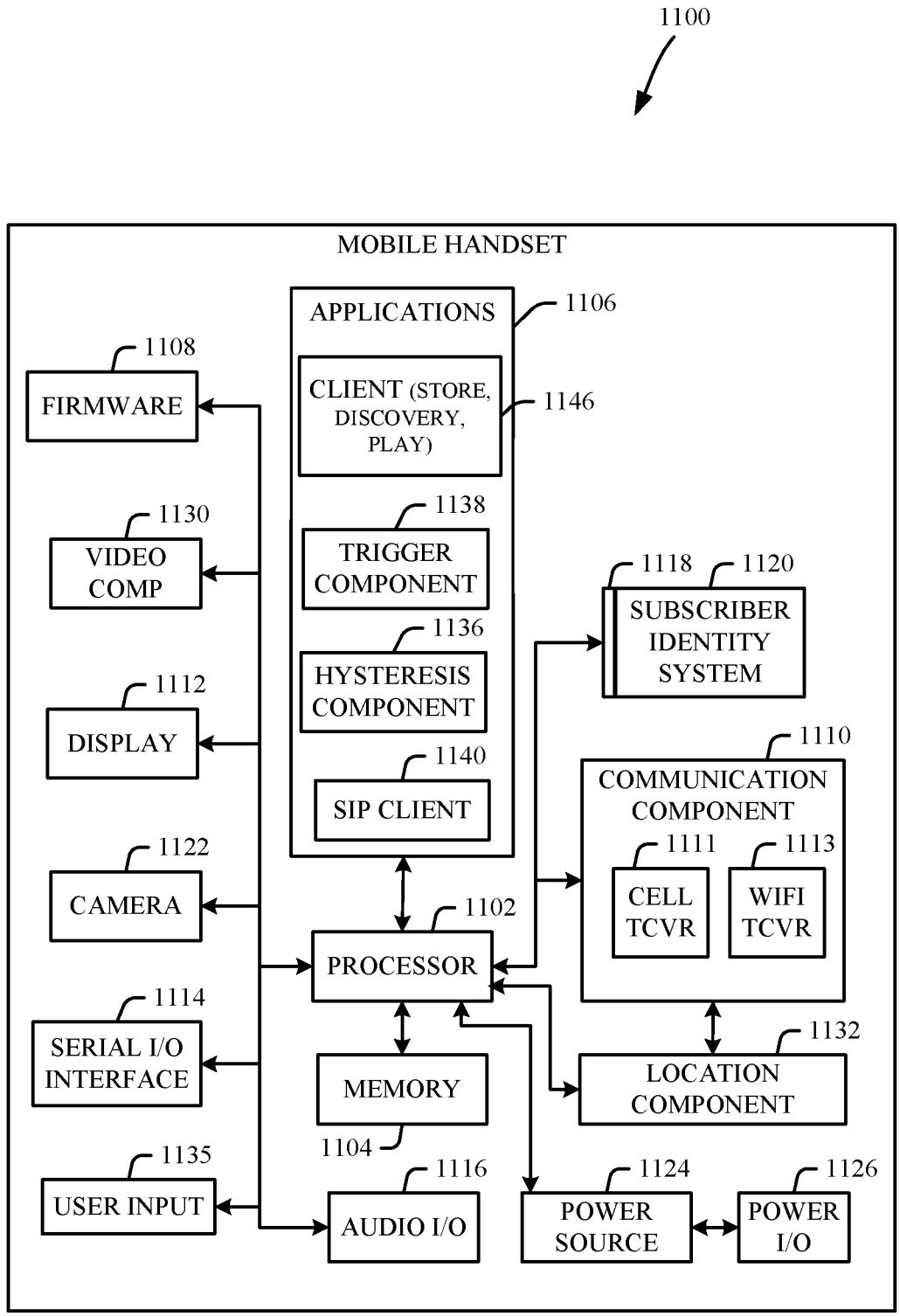
FIG. 11 illustrates an example block diagram of an example mobile handset operable to engage in a system architecture that facilitates wireless communications according to one or more embodiments described herein.

Referring now to FIG. 11, illustrated is a schematic block diagram of an example end-user device such as a user equipment) that can be a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (i.e., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (i.e., a Caller ID function), setup functions, and for user input. For example, the display 1112 can also be referred to as a "screen" that can accommodate the presentation of multimedia content (i.e., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (i.e., USB, and/or IEEE 1394) through a hardwire connection, and other serial input devices (i.e., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an internet service provider (ISP) or broadband cable provider. Thus, Voice over IP (VoIP) traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an alternating current (AC) power subsystem, which power source 1124 can interface to an external power system or charging equipment (not shown) by a power input/output (110) component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A session initiation protocol (SIP) client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
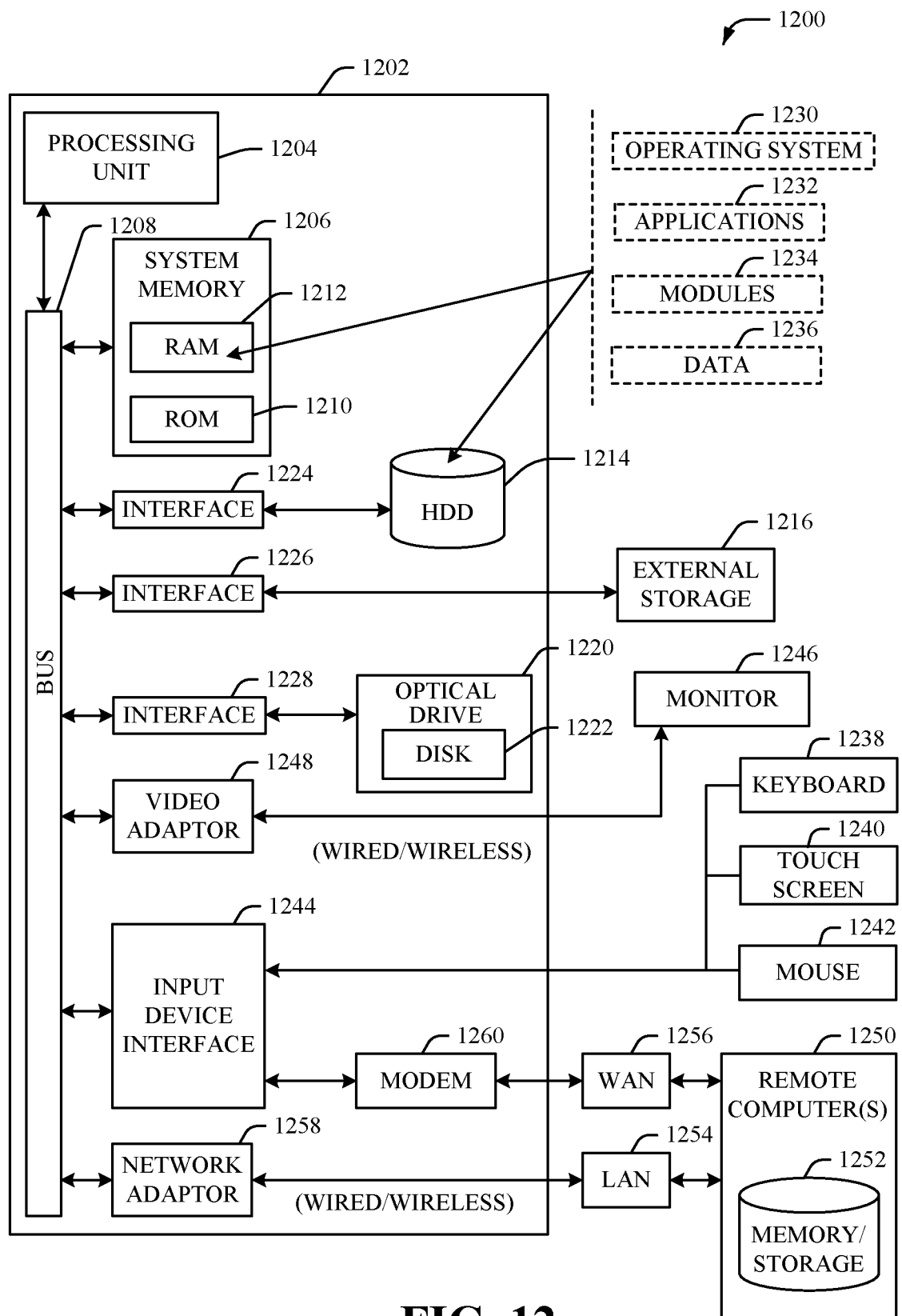
FIG. 12 illustrates an example block diagram of an example computer/machine system operable to engage in a system architecture that facilitates wireless communications according to one or more embodiments described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, i.e., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD), non-volatile memory and other storage technology could be used in addition to, or in place of, an HDD 1214, and can be internal or external. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally include emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can include one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a universal serial bus (USB) port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, i.e., a wide area network (WAN) 1256. Such LAN and WAN networking environments are commonplace in offices and companies, and facilitate enterprise-wide computer networks, such as intranets, all of which can connect to a global communications network, i.e., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 12 Mbps (802.11b) or 84 Mbps (802.11a) data rate, for example, or with products that contain both bands (dual band), so the networks can provide real-world performance similar to the basic "10BaseT" wired Ethernet networks used in many offices.

As is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (i.e., a capacity to make inference based on complex mathematical formalisms) which can provide simulated vision, sound recognition, and so forth. In addition, the terms "wireless network" and "network" are used interchangeably in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:
1. A system, comprising:
a processor; and a memory that stores executable instructions which, when executed by the processor of a spectrum access engine associated with a communications network, facilitate performance of operations, wherein the spectrum access engine is communicatively coupled to a spectrum access engine appliance of an enterprise network to receive data analytics information associated with the communications network, and the operations comprise:

obtaining energy detection data corresponding to a sensed signal strength of a user equipment communicating via a channel allocated in a first portion of network spectrum of the communications network;

determining that the sensed signal strength is below a defined threshold value;

in response to the determining, allocating, to the user equipment, a frequency channel in a second portion of the network spectrum; and transferring the user equipment to communicate via the frequency channel in the second portion of the network spectrum.

2. The system of claim 1, wherein the first portion of the network spectrum comprises millimeter wave spectrum, and wherein the second portion of the network spectrum comprises sub-six gigahertz (Sub-6) spectrum.

3. The system of claim 2, wherein the Sub-6 spectrum comprises a citizens band radio service spectrum or a non-citizens band radio service spectrum.

4. The system of claim 3, wherein the network spectrum is a fifth generation (5G) network spectrum, wherein the operations further comprise, determining, by the spectrum access engine, signals of an incumbent device associated with an incumbent entity operating in the citizens band radio service spectrum, and wherein the allocating comprises selecting the frequency channel in the citizens band radio service spectrum so as not to interfere with the signals of the incumbent device.

5. The system of claim 1, wherein the first portion of the network spectrum comprises millimeter wave spectrum, and wherein the second portion of the network spectrum comprises Sub-6 non-citizens band radio service spectrum.

6. The system of claim 1, wherein the spectrum access engine is configured as a centralized integration point to at least one of: a single carrier core network fifth generation (5G) next generation core, a 5G gateway, a long term evolution (LTE) gateway, or a combination of a 5G carrier core network gateway and the LTE gateway.

7. The system of claim 1, wherein the spectrum access engine is configured as a centralized integration point for location-based services.

8. The system of claim 1, wherein the spectrum access engine is configured to allocate dynamic spectrum sharing spectrum resources for at least one of: 4G Long Term Evolution (LTE) and fifth generation (5G) new radio technologies to operate concurrently using shared LTE spectrum resources, or 5G new radio technologies to operate concurrently using at least one of: shared Sub-6 spectrum resources or shared millimeter wave spectrum resources.

9. The system of claim 1, wherein the operations further comprise, managing by the spectrum access engine, mobile applications and mobile devices, the managing comprising controlling at least one of: device quality of service, device priority, device preemption, Internet Protocol data communication, location-based routing, location-based switching, data acquisition, data delivery, or data correlation.

10. The system of claim 1, wherein the spectrum access engine interfaces with a self-optimizing network and a software-defined network based on network function virtualization, and wherein the operations further comprise adjusting network operations via the self-optimizing network and a software-defined network based on changing network conditions.

11. The system of claim 1, wherein the spectrum access engine is coupled to a data analytics engine and a recommendation engine, and wherein the operations further comprise generating fifth generation (5G) spectrum access and allocation requests based on current in-field spectrum access requests and information from the data analytics engine and the recommendation engine based on historical 5G spectrum usage data.

12. The system of claim 1, wherein the spectrum access engine is coupled to a mediator device that mediates spectrum access as assigned to different carriers.

13. The system of claim 1, wherein transferring the user equipment to communicate via the frequency channel in the second portion of the network spectrum comprises determining a time-division duplex channel, or determining a frequency-division duplex downlink channel and a frequency-division duplex uplink channel.

14. A system, comprising:

a processor; and a memory that stores executable instructions which, when executed by the processor of a spectrum access engine associated with a communications network, facilitate performance of operations, wherein the spectrum access engine interfaces with a self-optimizing network and a software-defined network of the communications network based on network function virtualization, and the operations comprise:

obtaining energy detection data corresponding to a sensed signal strength of a user equipment communicating via a channel allocated in a first portion of network spectrum;

determining that the sensed signal strength is below a defined threshold value;

in response to the determining, allocating, to the user equipment, a frequency channel in a second portion of the network spectrum;

transferring the user equipment to communicate via the frequency channel in the second portion of the network spectrum; and adjusting network operations of the communications network via the self-optimizing network and the software-defined network based on changing network conditions of the communications network.

15. The system of claim 14, wherein the first portion of the network spectrum comprises millimeter wave spectrum, and wherein the second portion of the network spectrum comprises sub-six gigahertz (Sub-6) spectrum.

16. The system of claim 15, wherein the Sub-6 spectrum comprises a citizens band radio service spectrum or a non-citizens band radio service spectrum.

17. A system, comprising:

a processor; and a memory that stores executable instructions which, when executed by the processor of a spectrum access engine associated with a communications network, facilitate performance of operations, wherein the spectrum access engine is coupled to a data analytics engine and a recommendation engine, and the operations comprise:

obtaining energy detection data corresponding to a sensed signal strength of a user equipment communicating via a channel allocated in a first portion of network spectrum;

determining that the sensed signal strength is below a defined threshold value;

in response to the determining, allocating, to the user equipment, a frequency channel in a second portion of the network spectrum;

transferring the user equipment to communicate via the frequency channel in the second portion of the network spectrum; and generating 5G spectrum access and allocation requests based on current in-field spectrum access requests, and information from the data analytics engine and the recommendation engine based on historical fifth generation (5G) spectrum usage data.

18. The system of claim 17, wherein the first portion of the network spectrum comprises millimeter wave spectrum, and wherein the second portion of the network spectrum comprises sub-six gigahertz (Sub-6) spectrum.

19. The system of claim 18, wherein the Sub-6 spectrum comprises a citizens band radio service spectrum or a non-citizens band radio service spectrum.

* * * * *